May 17, 1932.  P. E. BOEUF  1,859,126

COCK

Filed March 14, 1930  2 Sheets-Sheet 1

P. E. Boeuf
INVENTOR

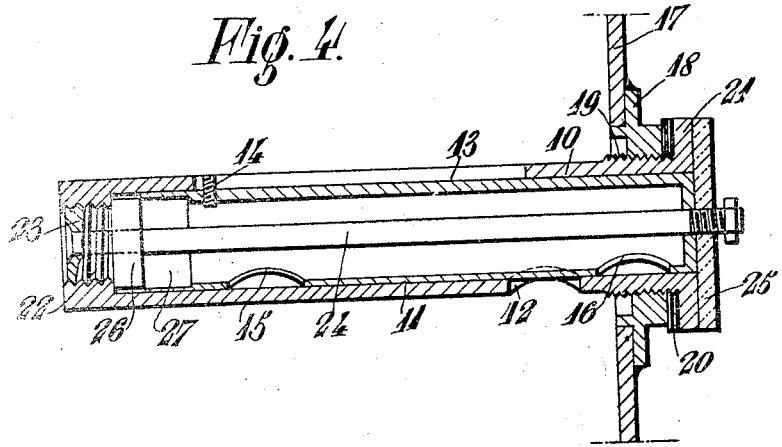
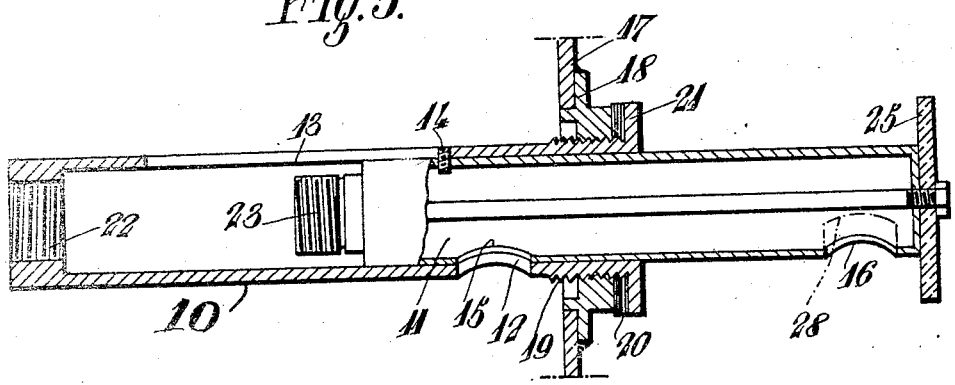
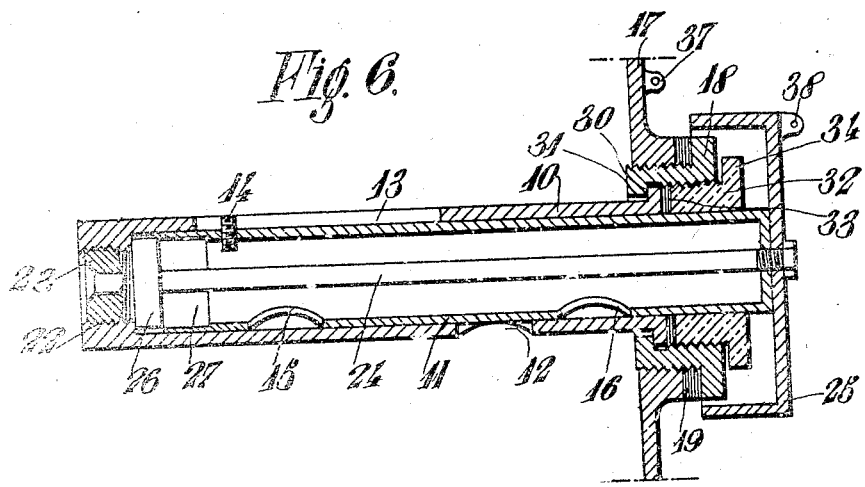

Patented May 17, 1932

1,859,126

UNITED STATES PATENT OFFICE

PIERRE EUGÈNE BOEUF, OF ERMONT, FRANCE

COCK

Application filed March 14, 1930, Serial No. 435,911, and in France March 25, 1929.

The present invention more particularly relates to improvements in cocks in which use is made of two telescopic elements or tubes provided with suitably arranged ports so that the extended position of the telescopic elements ensures the opening of the cock. Such cocks are more especially intended to ensure the emptying of casks or barrels on which they are permanently mounted.

The improvements, forming the main object of the invention and which more particularly refer to cocks of the telescopic type for any applications are mainly characterized by the following points applied separately or in combination:

(a) The inner telescopic tube, acting as plug, moves only in translation and is provided, for that purpose, with a claw fitted into a corresponding groove of the fixed tube;

(b) The inner tube which can be subjected to the action of a resiliently distortable member is folded down, with play, at one of its ends, into a corresponding groove provided in the bung.

(c) An outer stopper mounted on the inner telescopic tube acting as a plug is used, on the one hand, an operating member for the cock and, on the other hand, as bung.

(d) The inner telescopic tube which moves only in translation relatively to the fixed outer telescopic tube is locked on the latter, in closing position of the cock, through the medium of a screw threaded member, screwed in a corresponding threaded portion in the telescopic tube; the screw threaded portion has an operating and gripping member also used as operating member for the cock.

(e) The outer telescopic tube is rigidly mounted on a plug for securing it to the receptacle, through the medium of an externally threaded annular member allowing the passage of the movable inner telescopic tube, so that by arranging the latter in the suitable angular position which determined the appropriate position of the outer telescopic tube to which it is angularly connected, it is possible to secure the outer tube in a correct position.

These improvements can give rise to numerous forms of construction which are obviously all included in the scope of the present invention and can particularly differ from each other:

By the means ensuring the connection between the telescopic tube and the bung which can be rigidly held stationary on this tube or only in translation.

By the shape and constitution of the bung which can, for instance, have a screw threaded portion or a conical part fitting into a corresponding housing of the cask.

By the shape and constitution of the telescopic tubes in which are provided suitable ports.

By the shape and constitution of the screw threaded member which is preferably connected to the gripping and operating member by a rod axial relatively to the tubes and which engages with a corresponding screw thread formed in a perforation provided in the bottom of the outer tube.

By the shape and constitution of the externally tubular member securing the outer tube.

By the shape and constitution of the gripping member.

The invention also concerns other particular points and particularly the arrangement, within the inner tube and opposite the outlet port, of a transverse connecting branch which can be constituted by the bent down edges of the said port.

The accompanying drawings illustrate, by way of example only, forms of construction of an improved cock in accordance with the invention.

Fig. 4 is an axial section of a third form of construction of a cock in closed and locked position.

Fig. 5 is a corresponding axial section (the cock being open).

Fig. 6 is an axial section of a fourth form of construction.

Figure 1:
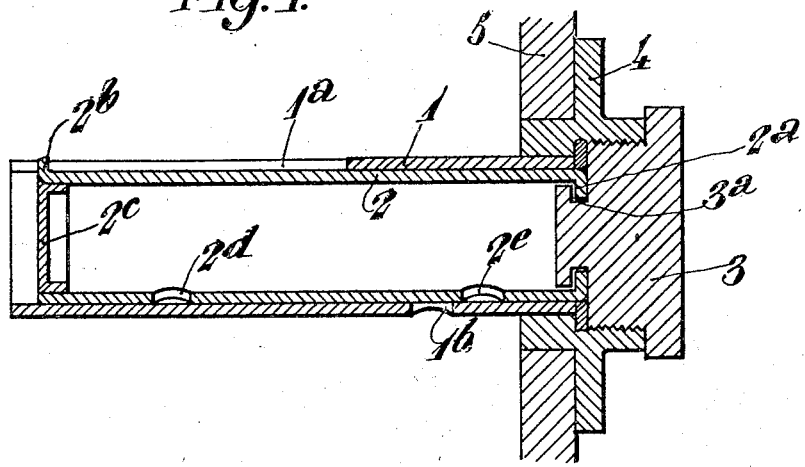
Fig. 1 is an axial section of a first form of construction, the cock being closed.
Figure 2:
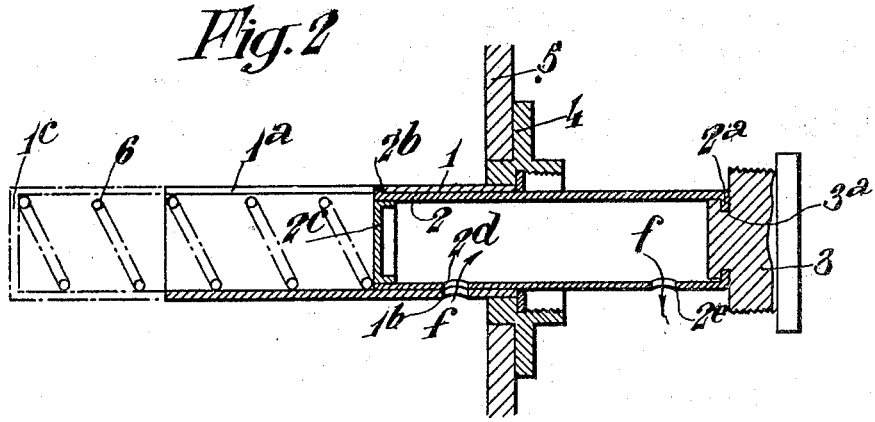
Fig. 2 is a corresponding axial section, the cock being open.
Figure 3:
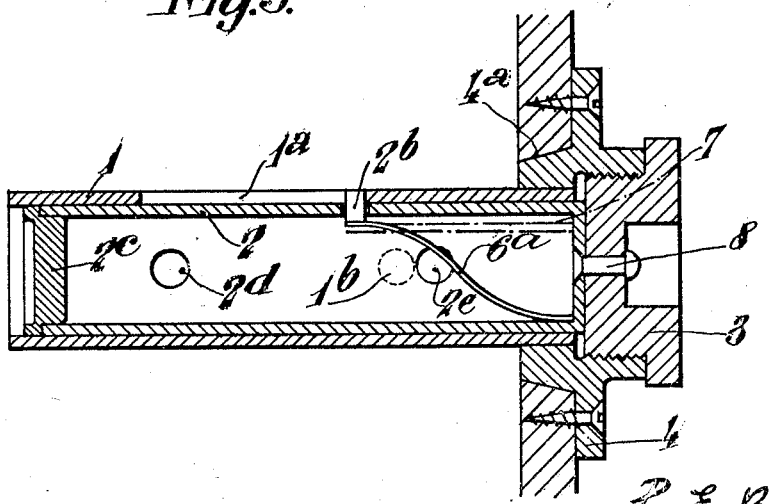
Fig. 3 is a plan view of a second form of construction with axial section.

The cock illustrated in Figs. 1, 2 and 3 comprises two telescopic tubes 1 and 2. The inner tube 2 acting as a plug is bent down, at one of its ends, at 2ª, in a groove 3ª provided in a bung 3. The latter is screwed in closing position of the cock, in a member 4 secured to the cask 5 and on which is rigidly mounted the tube 1. The bung 3 can angularly move about the longitudinal axis of the tube 2. The latter is angularly held stationary by a claw 2ᵇ fitted into a groove 1ª provided in the tube 1. The tube 2 can be obturated, at its free end, by a stopper 2ᶜ, as illustrated in the accompanying drawings. This stopper 2ᶜ can, for instance, be constituted by a patch, made of leather or similar material, mounted at the end of the tube 2 (Fig. 3) and the outer walls of which fit against the inner walls of the tube 1. Ports 1ᵇ, 2ᵈ and 2ᵉ respectively provided, the first in the side wall of the tube 1 and the others in the side wall of the tube 2 are so arranged that, in opening position, the port 2ᵈ is placed opposite the port 1ᵇ, the port 2ᵉ being used by ensuring the evacuation of the liquid to the exterior.

A spring 6 can be interposed between the bottom 2ᶜ and a flange 1ᶜ for the purpose of automatically ensuring the opening of the cock as soon as the bung 3 is unscrewed.

The operation of the cock previously described is as follows:

The bung 3 being unscrewed, the opening of the cock is ensured, either manually by exerting a pull on the bung 3 or automatically, in case the cock is provided with a spring such as 6. The liquid flows out as indicated by the arrows *f* and the closing of the cock is obtained by effecting the operations reverse to those previously indicated for effecting the opening.

It is obvious that the cock previously described can be mounted, without important modifications, on casks in use. In the modification illustrated in Fig. 3, the claw 2ᵇ can be released from the groove 1ª for ensuring the removal of the tube 2. For that purpose, the claw 2ᵇ is mounted at the end either of a resiliently distortable blade 6ª, or of an angularly movable rod 7.

In this form of construction, the member 4 is provided with a frustum-shaped part 4ª and the bung 3 is connected to the tube 2 through the medium of a rod 8.

In the form of construction illustrated in Fig. 4 and 5, the cock comprises two telescopic tubes 10 and 11 provided, the first, with a port 12 and a groove 13 in which is fitted a claw 14 rigid with the inner tube 11 in which are provided two parts 15 and 16 arranged as shown in drawings.

The cock, in accordance with the invention, is mounted on a cask 17 through the medium of a member 18 rendered rigid with the cask by soldering for instance, or by any other suitable means. The member 18 is internally threaded at 19 and with this threaded portion engages a corresponding externally threaded portion on the outer tube 10. A fluid-tight packing 20 is moreover interposed, upon assemblage, between the member 18 and a flange 21 of the member 10.

The inner end of the tube 10 is axially provided with an internally threaded portion 22 with which engages in closing position, a corresponding member 23 rigidly connected through a rod 24, with a gripping and operating member 25. A flange or ring 26, rigid with the rod 24, is fitted into a cylindrical chamber 27 provided in the tube 11, so that this ring can move in translation in the tube 11 during the operation of the screw threaded member 22, but then drives the tube 11 in translation as soon as a pull is exerted on the operating member 25. A fluid-tight packing, not shown, can be moreover interposed between the flange 21 and the member 25.

In accordance with the invention, an inner nozzle 28 is shown in dot and dash lines and can be constituted by inwardly bending down the edges of the port 16.

The form of construction illustrated in Fig. 6 is a very advantageous constructional modification as it allows of correctly securing the tube 10. In fact, in this form of construction, the tube 10 has a flange 30 which is held against a shoulder 31 of the member 18 by a member 32 with interposition of a fluid-tight packing 33. The member 32 has an operating hexagonal head 34 and allows the free passage of the central tube 11. By holding the latter in suitable angular position to which corresponds the correct position of the tube 10, it is possible to effect the locking of the latter. For effecting this locking, the tube 11 is slightly displaced for allowing of holding it, but in such a position that the cock is still in closed position. The fluid tight packing 33 ensures moreover the automatic wiping of the tube 11 during the manipulation of the latter.

The gripping member 25, as shown in Fig. 6, has the shape of a cap which covers the member 18 in closing position, so that it is not possible to effect the removal of this member during transport if a sealed security wire is engaged into lugs 37 and 38 integral, the first, with the cask 17, and the second, with the member 25. The latter can bear moreover general indications for the operation of the cock.

It is obvious that the forms of construction described and illustrated are only simple examples capable of receiving modifications, as well in the constitution of the various elements as in the relative arrangement of the latter. All modifications which do not alter in any way the main features above set forth, are included in the scope of the invention.

What I claim as my invention and desire to secure by Letters Patent is:

1. In a cock, a fixed outer tube, a movable inner tube and means for allowing the displacement, in translation only, of the said inner tube relative to the said outer tube, said tubes constituting a cock of the telescopic type, a gripping and operating member forming a bung mounted at the outer end of the inner tube and capable of an angular displacement on and relative to the said inner tube, a fixed threaded member, and a threaded portion on the said gripping and operating member engageable with the fixed member for locking the said inner tube in the closed position.

2. In a cock, a fixed outer tube, a movable inner tube and means for allowing the displacement, in translation only, of the said inner tube relative to the said outer tube, said tubes constituting a cock of the telescopic type, a gripping and operating member forming a bung mounted at the outer end of the inner tube and capable of an angular displacement on and relative to the said inner tube, a fixed threaded member, and a threaded portion on and forming an integral part of said gripping and operating member and engageable with the fixed member for locking said inner tube in closed position.

In testimony whereof I have signed this specification.

PIERRE EUGÈNE BOEUF.